H. E. BJORLIN.
BREAD SLICING MACHINE.
APPLICATION FILED MAR. 13, 1922.
1,420,235. Patented June 20, 1922.
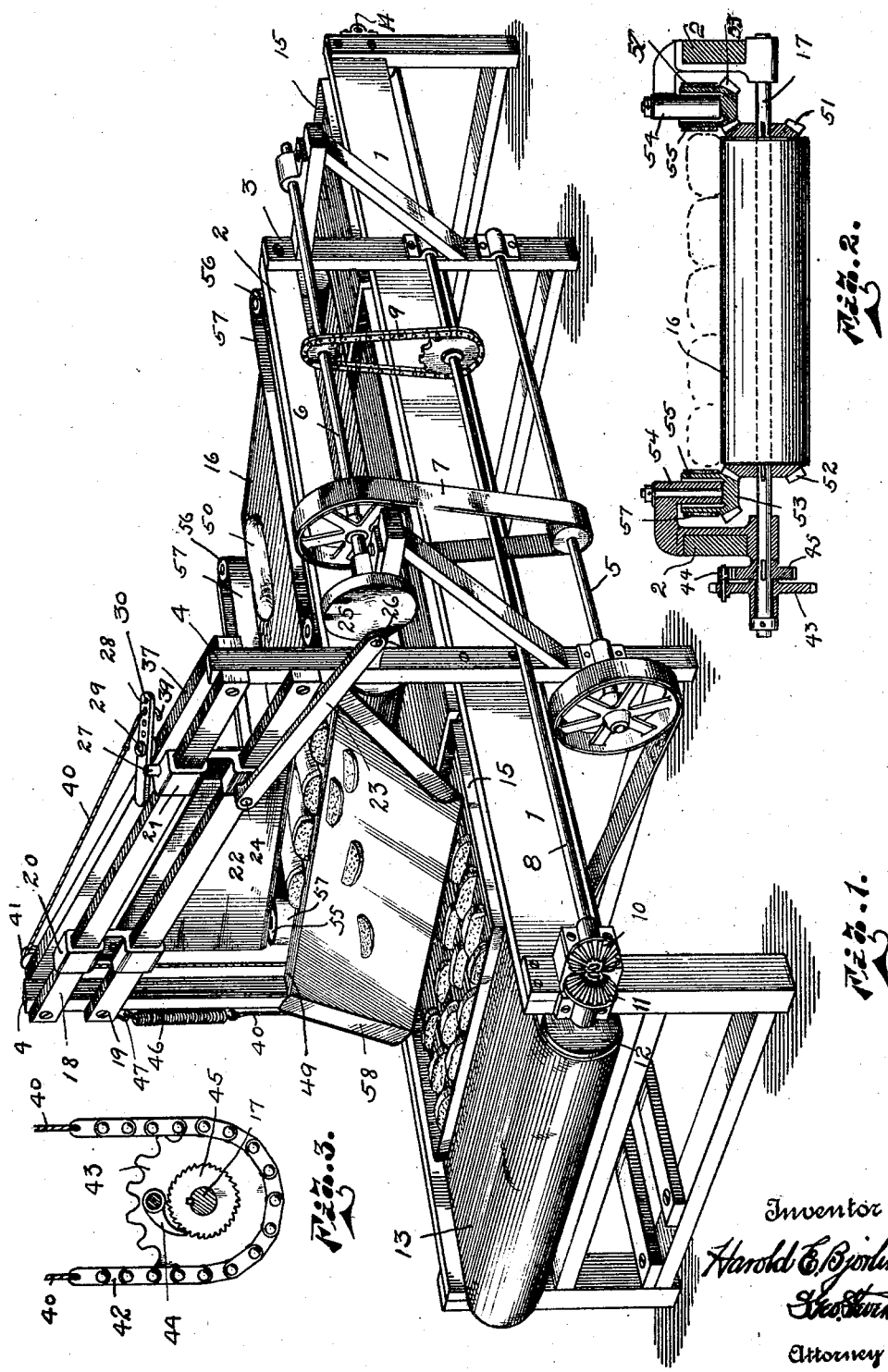

UNITED STATES PATENT OFFICE.

HAROLD E. BJORLIN, OF DULUTH, MINNESOTA.

BREAD-SLICING MACHINE.

1,420,235.

Specification of Letters Patent. Patented June 20, 1922.

Application filed March 13, 1922. Serial No. 543,193.

*To all whom it may concern:*

Be it known that I, HAROLD E. BJORLIN, a citizen of the United States, residing at Duluth, in the county of St. Louis and State of Minnesota, have invented certain new and useful Improvements in Bread-Slicing Machines, of which the following is a specification, reference being had therein to the accompanying drawing.

This invention relates to bread slicing and panning machines and has special reference to such a machine for use when large quantities of bread are prepared for toasting, as for example in bakeries or the like.

The principal object of the invention is to produce a practical and efficient machine of this character.

Other objects and advantages of the invention will appear in the further description thereof.

Referring to the accompanying drawing forming part of this application in which like reference characters indicate like parts:

Figure 1 is a perspective view of the completely assembled machine as it would appear in operation;

Figure 2 is a transverse sectional view through the bread conveying belt driving shaft; and Figure 3 is an enlarged view of the chain and sprocket feed for the bread conveying belt.

1 represents a table like fabricated structure, supported upon suitable legs and carrying a shorter superposed frame like structure 2 spaced somewhat thereabove. This superposed structure is carried upon extensions 3 and 4 of the intermediate legs of the table.

A suitable power shaft 5 is mounted upon the lower extremities of the intermediate legs and is provided with power from any desired source. Above this shaft and parallel therewith and supported upon the extensions 3 and 4 is a counter shaft 6 deriving its motion from the drive shaft 5 through the medium of a suitable pulley and belt, the latter being illustrated at 7, while a second counter shaft 8, adjacent the side of the table 1 and intermediate of the shafts 5 and 6, is driven by suitable sprocket wheels and a chain 9 from a counter shaft 6. The shaft 8 carries a miter gear 10 at its forward end meshing with a similar gear 11 on the transverse shaft carrying the belt conveying roller 12, the belt being illustrated at 13. The opposite end of this belt is carried upon the shaft 14 at the opposite end of the table, the belt extending the full length thereof. This belt is for the conveying of the trays or pans 15 which gather the slices of bread as they fall from the cutting device and are fed continuously therethrough as the machine is operated.

A second shorter conveyor belt 16 is mounted upon suitable transverse shafts in the extensions 3 and 4, the forward or driving one of which shafts being illustrated at 17, said belt being for the purpose of conveying the loaves of bread to the cutting knife and is actuated intermittently for the purpose described later.

One of the upright extensions 4 is considerably longer than the other and they are united by spaced inclined transverse bars or members 37 and 18 and 19, the two latter being on the front side of the bars and spaced one above the other, while the bar 37 is on the back of the extensions 4, opposite the bar 18. Slidably mounted upon the bars 18 and 19 are two brackets 20 and 21 which carry the cutting knife 22, the lower edge of which is suitably sharpened and parallel with the top of the belt 16 the latter being flush with the cross piece 49 intermediate of the two extensions 4 and against which the cutting edge of the knife impinges at each downward stroke after properly functioning in the bread cutting operation. Lateral and vertical motion is imparted to the knife 22 by means of the pitman 23 being pivotally attached as at 24 to the bracket 21 and pivotally attached to the crank disc 25 as at 26, said disc being rigidly fixed to the extreme forward end of the counter shaft 6 so that as the latter rotates the knife 22 will be reciprocated longitudinally of the inclined supporting members 18 and 19, thus raising and lowering it from engagement with the member 49, and at the same time giving it a lateral movement in respect to the machine which is essential to result in a clean cut.

As a means for conveying the cut material to the trays 15 carried on the belt 13 I provide an inclined apron 58 so that the fall of the material is somewhat retarded to avoid disintegration or breakage.

To the upper end of the bracket 21 is rigidly fixed a pin 27 which just prior to the extreme upper limit of said bracket as the knife 22 is raised will engage the inner end of the cross arm 28 which is pivotally mounted as at 29 upon the cross bar 37. The opposite end of the cross bar 28 is provided with a plurality of holes 30 therein in which the hook 39 on the end of the line 40 is engaged, and may be adjusted from one hole to another for the purpose hereinafter described.

The line 40 leads upwardly and laterally towards the higher one of the extensions 4 where it passes over a suitable sheave 41 and downwardly adjacent the transverse feeding belt shaft 17 in the superposed structure before described. At this point the line 40 has incorporated therein a short length of sprocket chain 42 which engages the sprocket wheel 43 loosely mounted upon the shaft 17. This sprocket wheel carries a pawl 44 which engages the ratchet wheel 45 fixed to the shaft 17 whereby at every fractional movement of the sprocket wheel 43 the shaft 17 is rotated a fraction of a turn. The opposite end of the line 40 is extended upwardly parallel with the extension 4 adjacent which it is provided with a contractile spiral spring 46 rigidly attached as at 47 to any convenient portion of the structure.

From the foregoing it is evident that as the line 40 is given intermittent reciprocal motion simultaneously with the action of the knife the said belt shaft 17 will be operated in step therewith, that is to say, as the knife 22 approaches its uppermost limit, the shaft 17 will be slightly rotated, carrying forwardly with it the said belt 16 mounted thereupon, and as the loaves of bread, indicated at 50, are carried upon said belt, they will be fed intermittently beneath the knife, and at each downward stroke thereof will be cut as is obvious.

Adjacent the ends of the roller on the shaft 17 which carried the feeding belt 16 are beveled gears 51 and 52 they meshing with smaller beveled gears 53 carried on any desired form of upright spindles 54, said gears having pulleys or rollers 55 formed integral therewith and about which, together with somewhat similar pulleys 56, adjacent the opposite end of said belt, are mounted narrow endless belts 57, they forming the side walls of the feeding trough as it were so that friction is avoided against such side walls, they being thus made movable with the said belt, for as is obvious, when said belt moves, these narrow side belts will also move, the beveled gears 51 and 52 being connected to the shaft 17 and caused to rotate therewith.

Thus when the machine is operated all that is necessary is to keep the live feeding trough filled with loaves of bread, the tray belt supplied with trays, and the filled trays removed; the size of the various driving elements of the machine being so proportioned as to result in the desired filling of the trays as they are fed through the machine; when each tray-full of slices is then ready to be passed on to the baking or other step in the process of providing a commercial toasted product.

Having thus described my invention, what I claim and desire to secure by Letters Patent, is:

The combination with a machine for slicing bread including an endless loaf feeding belt and a slidable cutting knife operable upon inclined ways, of a pin carried by said knife, a lever pivotally mounted upon the knife ways, one end of which lever is operable in one direction by engagement with the pin at the termination of the upward stroke of the knife, said lever having a plurality of spaced holes in the opposite end, a reciprocable line having a hook at one end for selective engagement within the holes in the lever and a contractile spiral spring at the opposite end so that the pivotal lever is normally held for engagement by the pin, a pawl and ratchet mechanism engaged with the line intermediate of its ends and operated thereby and means cooperatively uniting the pawl and ratchet mechanism with the loaf feeding belt whereby intermittent motion is imparted to the latter.

In testimony whereof I hereunto affix my signature in the presence of two witnesses.

HAROLD E. BJORLIN.

Witnesses:
S. C. BRONSON,
S. GEO. STEVENS.